United States Patent
Kim

(10) Patent No.: US 9,913,457 B2
(45) Date of Patent: Mar. 13, 2018

(54) ILLUMINATED NAIL CLIPPER

(71) Applicant: Yijung Kim, Brooklyn, NY (US)

(72) Inventor: Yijung Kim, Brooklyn, NY (US)

( * ) Notice: Subject to any disclaimer, the term of this patent is extended or adjusted under 35 U.S.C. 154(b) by 141 days.

(21) Appl. No.: 14/817,831

(22) Filed: Aug. 4, 2015

(65) Prior Publication Data

US 2017/0035027 A1    Feb. 9, 2017

(51) Int. Cl.
| | | |
|---|---|---|
| *A01K 17/00* | (2006.01) | |
| *A01K 13/00* | (2006.01) | |
| *F21V 3/04*  | (2018.01) | |
| *F21V 33/00* | (2006.01) | |
| *F21Y 115/10*| (2016.01) | |

(52) U.S. Cl.
CPC ............. *A01K 17/00* (2013.01); *A01K 13/00* (2013.01); *F21V 3/049* (2013.01); *F21V 3/0445* (2013.01); *F21V 33/0004* (2013.01); *F21Y 2115/10* (2016.08)

(58) Field of Classification Search
CPC .......... A01K 17/00; A45D 29/02; B25B 7/08; B25B 7/22; B25B 7/00; F21V 33/0084; F21V 33/008
USPC ....................................................... 362/119
See application file for complete search history.

(56) References Cited

U.S. PATENT DOCUMENTS

| | | | | |
|---|---|---|---|---|
| 7,531,197 B2* | 5/2009 | Jones | ...................... | A23G 3/563 294/16 |
| 2006/0158871 A1* | 7/2006 | Hopkins | ................ | A01K 13/00 362/119 |

* cited by examiner

*Primary Examiner* — Anh Mai
*Assistant Examiner* — Matthew Peerce
(74) *Attorney, Agent, or Firm* — Carter Ledyard & Milburn LLP

(57) ABSTRACT

A light is disposed on a blade of a nail clipper and covered by a light housing. The housing is dimensioned and configured to the cutting edge of the blade of the nail clipper. The housing clears the cutting edge of the blade so as not to obstruct the cutting action of the blades in the clipper. Light emitted from the light housing is focused on a pet's nail intended to be cut due, in part, to the fact that the housing corresponds in shape to the cutting edge of the blade. The housing may be made of light diffusing material that also allows light to illuminate a pet's nail. The illuminated nail clipper allows a user to cut a pet's nail regardless of the position or angle of the nail and protects the users eyes from the direct exposure to the lighting source in the light housing.

3 Claims, 4 Drawing Sheets ns. Specifically,# ILLUMINATED NAIL CLIPPER

FIELD OF THE INVENTION

The present invention relates to nail clippers. Specifically, the invention relates to illuminated nail clippers for use on pet nails.

BACKGROUND OF THE INVENTION

Pet owners regularly trim pet nails as long nails can cause an irregular gait and may break leading to infections. Thus the importance of trimming pet nails has significant health benefits to the animals. Though pet nail cutters are ubiquitous and come in different styles there is still a danger of accidentally cutting a quick in the nail. One way pet groomers avoid cutting the quick is to cut the pet nail at an angle. However, if the nail is cut at too high an angle then the quick may still be inadvertently cut. An easy way to identify the quick in the nail is by illuminating the nail to see the silhouette of the quick therein.

Currently illuminated nail clippers exist on the market. However existing illuminated nail cutters scatter light or obstruct the view or cutting action of the clipper. Thus there is a need for an illuminated nail clipper that focuses the light on the nail to increase visibility of blood vessels in the nail. There is a need for an illuminated nail clipper that focuses the light on the nail that is being cut at any angle. There is a need for an illuminated nail clipper that will illuminate a nail when the blade is curved. It is desired that the light illuminating the nail be dimensioned and configured to a shape of the cutting portion of the nail clipper such as a semicircular shape found on scissor-style pet nail clippers. It is desired that the light illuminate a nail regardless of the angle at which the nail is inserted in the nail clipper. It is important that the light shine on the nail so the groomer may cut the nail in a variety of positions and angles. It is further desired that the light illuminate the nail intended to be cut without obstructing or shining into the eyes of the using the illuminated nail clipper. It is desired that an illuminated nail clipper illuminate a nail while protecting a user's eyes from direct exposure to the light source within the illuminated nail clipper.

BRIEF SUMMARY OF THE INVENTION

An illuminated nail clipper has a light disposed under a light housing panel. At rest, the clipper does not shine a light. When a user squeezes arms of the nail clipper, the light within the light housing panel is activated and is focused on the area the cutting edge or surface of the clipper is intended to cut. The housing panel has an edge that is matched to a blade cutting edge of the clipper and the panel is made of light diffusing material. Light that shines through the housing is focused on and directed to a pet's nail to illuminate the quick in the nail without obstructing the vision of the user using the illuminated nail clipper.

DETAILED DESCRIPTION OF THE INVENTION

Figure 1:
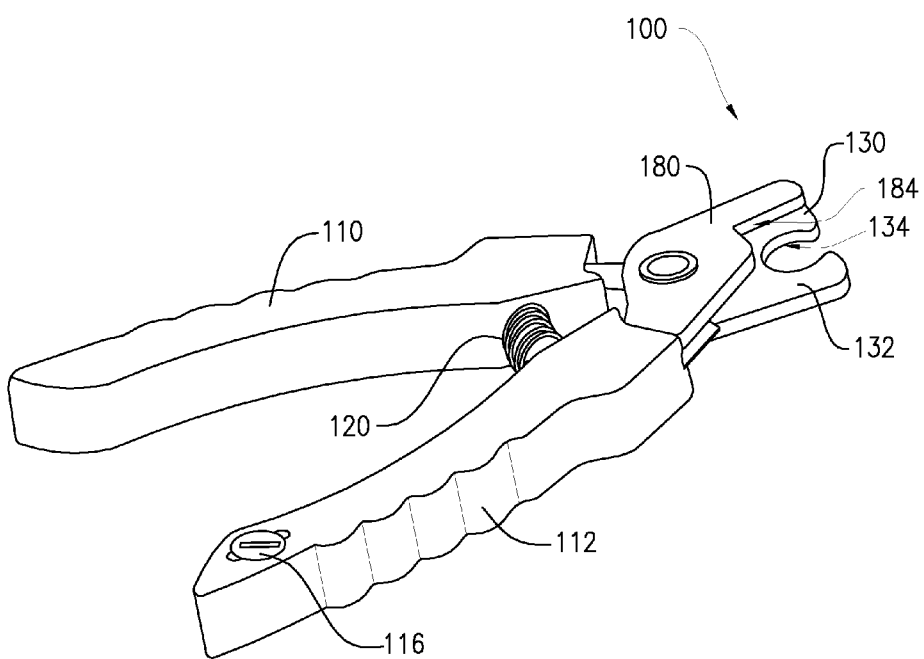
FIG. 1 is perspective picture of the illuminated nail clipper.

FIG. 1 shows a nail clipper 100 having arms 110, 112 and a first opposing blade 130 having a cutting edge 134, a second opposing blade 132 also with a cutting edge, a spring 120 disposed between the arms 110, 112, a battery door 116, a light housing or illuminated panel 180 with an edge 184 adjacent and close in profile with said cutting edge 134. The present invention will describe the invention with curved blade cutting edges as shown in FIG. 1. However, said cutting edges may take any form and need not be limited to said curved shape.

The light housing 180 is dimensioned and configured to a blade of the clipper 100 such as blade 130. See also FIG. 3A. The light housing 180 has a light housing edge 184 which is adjacent to the cutting edge 134 of the clipper 100. In some embodiments, the light housing edge 184 will mirror and match the contour or shape of the curved cutting edge 134. The light housing edge 184 may therefore matches in shape a profile of said cutting edge. The light housing edge 184 also lies near, abut and even touch the cutting edge 134 to illuminate the pet's nail. However, it should be noted that the light housing edge 184, though adjacent the cutting edge 134, will not obstruct the cutting edge 134 nor interfere with the cutting action of the blades 130, 132. By having the light housing edge 184 adjacent to the cutting edge 134 a user is able to direct the light emitted from the light 186 to the pet's nail that is being offered for clipping.

Figure 2:
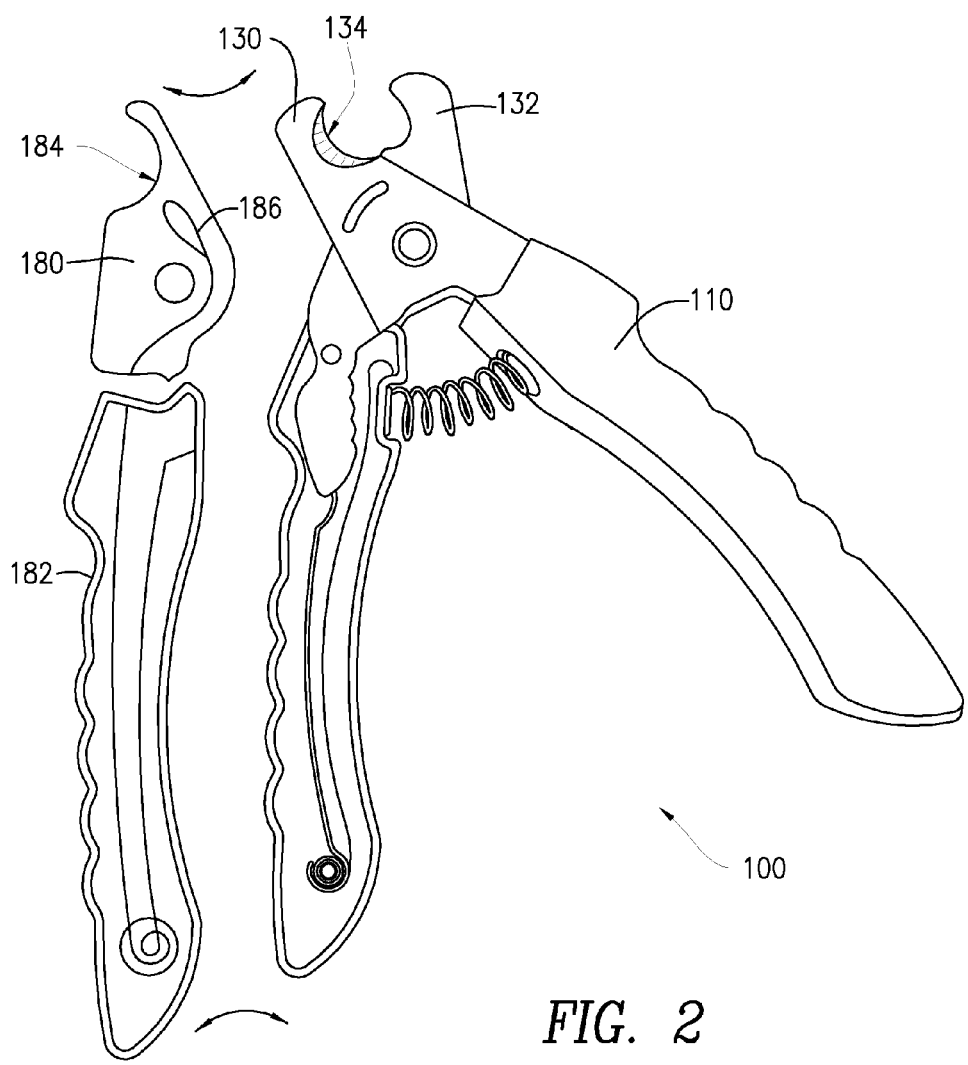
FIG. 2 is an inside view of the light housing or illuminated panel.

FIG. 2 shows the interior of the light housing 180 and arm panel 182 both of which are turned out and away from the blade 130 and arm 112, respectively. The housing 180 holds or cradles a light 186. The light 186 may be any form of light including but not limited to an LED light. The light housing 180 may be made of material that permits light to diffuse such as but not limited to acrylic. The arm panel 182 retains electrical components that are used to active the light 186.

By having the light 186 cradled in the light housing 180 and having the light housing edge 184 dimensioned and configured to blade cutting edge 134, the light rays emitted from light 186 are focused on the nail regardless of the angle or position at which the pet nail is being offered for clipping. Such a feature is quite useful when the clipper is used on an uncooperative animal whose nail is set to be cut. The nail intended to be cut is thus directly illuminated allowing the person using the clipper 100 to see the quick or blood vessel through the pet nail.

In one embodiment, the light housing 180 may be made of light diffusing material which contributes to the ability of the light rays emitted from the light 186 to be able to illuminate the nail that is intended to be cut. In this embodiment, the light rays emitted from the light 186 focus directly on the nail by being adjacent the cutting edge 134 and illuminate the pet nail by diffusing the light rays via the light diffusing material used in the housing 180. It should be noted that the housing 180 will be used to protect the user's eyes from light rays emitted by the light 186. Specifically, light rays emitted through the housing 180 are directed through housing edge 184 so the light rays do not directly shine into the eyes of the user.

Figures 3A, 3B:
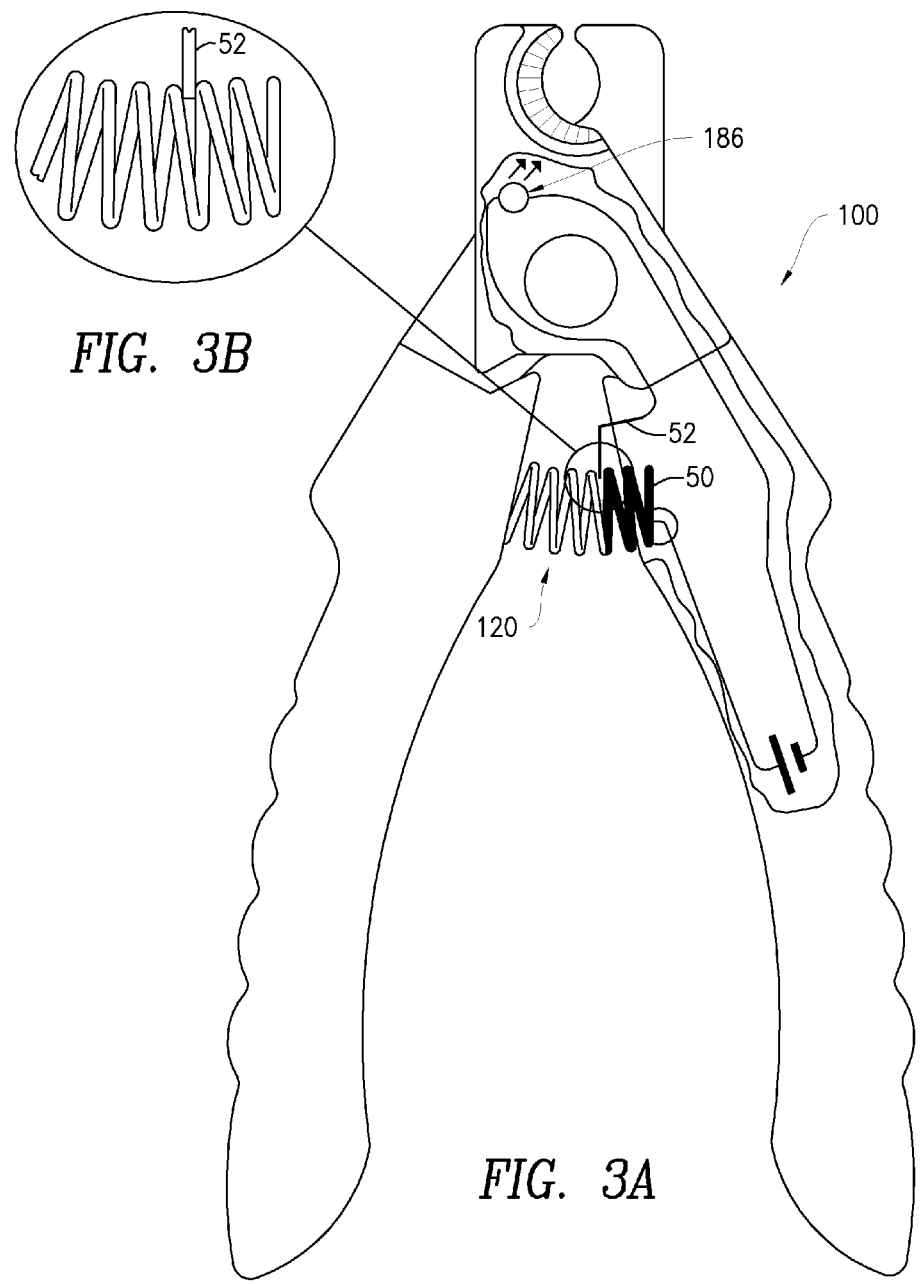
FIG. 3A is diagram of a circuit used with the illuminated nail clipper.
FIG. 3B is a concentrated view of the circuitry in the illuminated nail clipper.

Looking now to FIG. 3A, the clipper 100 is shown in a relaxed or first position with the arms 110, 112 apart. Here the light 186 is not active or on as the circuit is open. In a second position, also called an illuminated position, the arms 110, 112 of the clipper 100 are squeezed together activating the light 186 within the light housing 180. See FIG. 3B. The act of compressing the arms 110, 112 of the clipper 100 closes the battery powered electrical circuit and turns on light 186 when contact is made between a spring switch 50 in the spring 120 and a wire element 52. The spring 120 may be coated with an electric insulation material. The light may be powered by three watch batteries that is compact enough to fit in either arm 110, 112. In one embodiment, a battery cover 116 is designed to be opened and closed with a penny for easy access to the batteries. Unlike prior art clippers, the current clipper 100 does not require extra parts, such as a switch or a button to illuminate the light 186 in the clipper 100. The circuitry for illuminating the clipper, may, in one embodiment be found in an arm housing 182 disposed on either arm 110, 112. See FIG. 3A.

Figure 4:
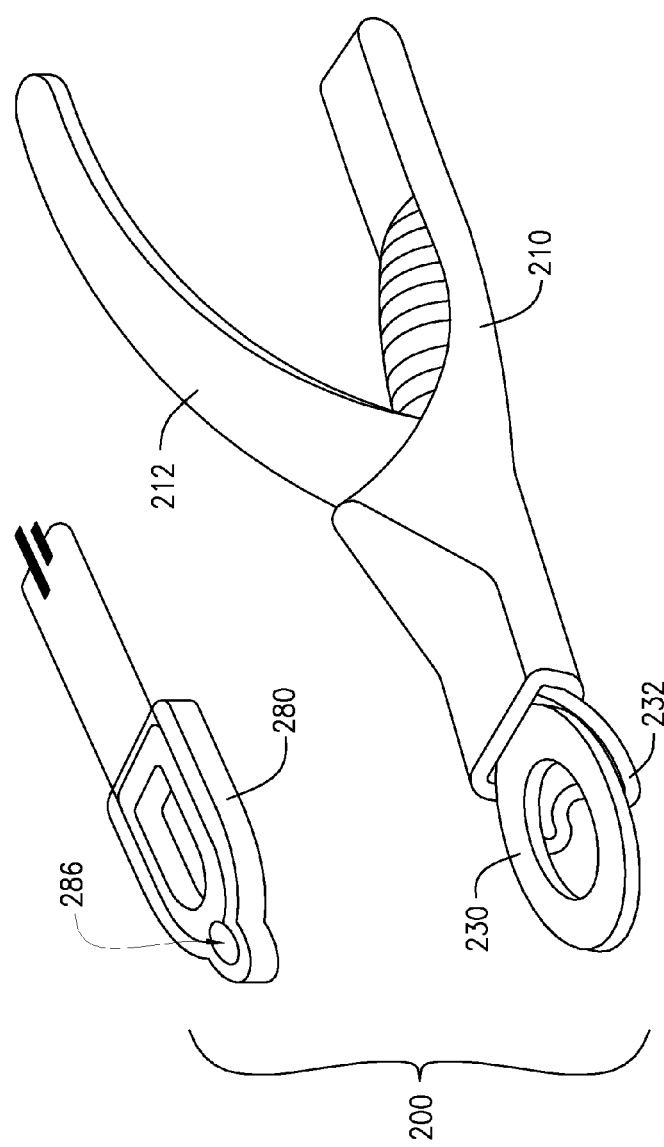
FIG. 4 is perspective picture of the illuminated guillotine-type nail clipper.

The invention above has been described with an illuminated scissor style nail clipper 100 however other clippers may be covered under the illuminated nail clipper description of the present invention. For instance, FIG. 4 shows a guillotine-type of illuminated nail clipper 200. The clipper 200 has guillotine blades 230, 232 that is illuminated by a light 286 that is held in a light housing 280. The housing 280 is disposed on blade 230 to illuminate a nail that is presented within the hole in blade 230. In another embodiment, the housing 280 is dimensioned and configured to a lower surface of blade 230 providing clearance for blade 232 to cut a nail. In yet another embodiment, the housing 280 is dimensioned and configured to a lower surface of blade 232 and may be further dimensioned and configured to a cutting edge of blade 232 to directly shine and focus light on the nail intended to be cut. The guillotine-type clipper 200 is illuminated when the arms 212, 210 are squeezed to activate the cutting action of the blades 230, 232. This squeezing action causes the electrical circuit within the clipper 200 to be closed similar to the description with clipper 100. When the arms 210, 212 are relaxed or in a first position the electrical circuit is open and the light 286 is off.

The guillotine-type clipper 200 will be constructed to have many of the features of the nail clipper 100. Similar to housing 180, housing 280 would be made to contour, match, and be dimensioned and configured to the guillotine blade 230. The housing 280 would also be designed to fit on the guillotine blade 230 without obstructing the cutting action of the blades 230, 232. Housing 280 cradles a light 286 and would be made of material useful in diffusing light emitted from light 286. Just like light 186, when light 286 is turned on the housing 280 illuminates any nail placed through the blades 230, 232 for clipping. The housing 280 focuses light rays emitted from light 289 on the nail without directly shining into the eyes of the user using the clipper 200 as the housing 280 is curved to the shape of the guillotine blade 230.

While the present invention has been described in conjunction with specific embodiments, those of normal skill in the art will appreciate the modifications and variations can be made without departing from the scope and the spirit of the present invention. Such modifications and variations are envisioned to be within the scope of the appended claims.

The invention claimed is:

1. An illuminated nail clipper comprising:
    a first handle and a second handle;
    a first blade connected to said first handle and a second blade connected to said second handle, wherein said first and second blade are axially connected, said first and second blade include a first and second cutting edge respectively, wherein said first and second cutting edges are located on an interior side of a top portion of said blade and are used to cut a subject's nail;
    a spring disposed between said first handle and said second handle
    a lighting module disposed on said first blade, said lighting module having a light housing edge, a light housing panel, and a lighting element, wherein said lighting element is disposed on said first blade and under said light housing panel, wherein said light module is dimensioned and configured to mirror a shape of said first blade of said clipper, said light housing panel being a light diffusive material to diffuse light emission and protect a user's eyes from light rays from said lighting element and only emitting rays from said lighting element via said light housing edge, wherein said light housing edge is a portion of said light housing panel that abuts and mirrors said cutting edge of said first blade and directs said emitted rays to shine only on said subject's nail when subject's nail is placed in between said first and second cutting edge of said clipper; and
    an arm panel connected to said lighting module and disposed on said first or second handle, said arm panel housing electrical components used to activate said lighting element, wherein in a first position said first and second handles are apart and said lighting element is in an inactive rest state, wherein in a second position, said first and second handles are compressed together activating said lighting element, wherein compressing said first and second handles closes a battery powered electrical circuit and turns on said lighting element when contact is made between a spring switch in said spring and a wire element.

2. The nail clipper of claim 1, wherein said first and second cutting edges are curved.

3. The nail clipper of claim 1, wherein said light housing edge mirrors a shape of said first cutting edge without obstructing cutting action of said first blade and said second blade.

\* \* \* \* \*